US011314023B2

(12) United States Patent
Tseng

(10) Patent No.: US 11,314,023 B2
(45) Date of Patent: Apr. 26, 2022

(54) OPTICAL CONNECTOR AND MODULE THEREOF

(71) Applicant: Chung-Ming Tseng, Myau-Li County (TW)

(72) Inventor: Chung-Ming Tseng, Myau-Li County (TW)

(73) Assignee: ACSUPER TECHNOLOGIES INC., Myao-Li County (TW)

( * ) Notice: Subject to any disclaimer, the term of this patent is extended or adjusted under 35 U.S.C. 154(b) by 0 days.

(21) Appl. No.: 17/074,654

(22) Filed: Oct. 20, 2020

(65) Prior Publication Data
US 2021/0263238 A1    Aug. 26, 2021

Related U.S. Application Data

(60) Provisional application No. 62/979,435, filed on Feb. 21, 2020.

(51) Int. Cl.
*G02B 6/38*    (2006.01)
(52) U.S. Cl.
CPC ......... *G02B 6/3869* (2013.01); *G02B 6/3825* (2013.01); *G02B 6/3878* (2013.01); *G02B 6/3887* (2013.01); *G02B 6/3893* (2013.01); *G02B 6/3888* (2021.05)

(58) Field of Classification Search
CPC .. G02B 6/3652; G02B 6/3829; G02B 6/3838; G02B 6/3862; G02B 6/3885; G02B 6/4214; G02B 6/3825; G02B 6/3835; G02B 6/3869; G02B 6/3874; G02B 6/3878; G02B 6/3887; G02B 6/3888; G02B 6/3893
USPC ...................................... 385/53–87
See application file for complete search history.

(56) References Cited

U.S. PATENT DOCUMENTS

2011/0081119 A1*  4/2011  Togami ............... G02B 6/4246
                                                          385/89
2014/0064675 A1*  3/2014  Tanaka ................. G02B 6/423
                                                          385/89

* cited by examiner

*Primary Examiner* — Michael P Mooney

(57) ABSTRACT

The present invention provides an optical connector electrically coupled to an optical receptacle. The optical connector comprises a connector body, and a sliding member. The connector body inserted into the optical receptacle comprises a housing and a boot structure detachably arranged in the housing. The sliding member is slidably coupled to the housing wherein the boot structure is restrained inside the housing or is removed from the housing according to a sliding position of the sliding member.

20 Claims, 18 Drawing Sheets

OPTICAL CONNECTOR AND MODULE THEREOF

CROSS-REFERENCE TO RELATED APPLICATION

This application claims the benefit under 35 U.S.C. § 119(e) to the U.S. provisional patent application having the Ser. No. 62/979,435 filed on Feb. 21, 2020, the entirety of which is incorporated herein by reference.

FIELD OF INVENTION

The present invention relates to an optical connector. In particular, it relates to an optical connector and module thereof with polarity change.

BACKGROUND OF THE INVENTION

Due to the advantages of high frequency bandwidth and low loss, optical fibers have been widely used as signal transmission media in recent years. The use of optical fiber has already had a major revolutionary impact in the communications industry. Nowadays, 100G optical module communication is not enough, and the future will be expected to move towards the era of 400G optical module communications.

In the field of 400G optical communications, there are also many designs for the packaging design of optical fiber modules, one of which is called Quad Small Form Factor Pluggable-Double Density (QSFF-DD). The specification, with a downward compatible design, has attracted the attention of many large manufacturers, and has launched corresponding specifications of optical communication module products.

In the optical module, in addition to the structure of the receptacle, the design of the optical connector is also very important. There are many types of optical connectors, and different manufacturers have different designs, such as SN connectors, MDC connectors, or LC connectors. When the connector is to be connected to the receptacle, sometimes the polarity of the connection needs to be changed to adapt to different situations.

Please refer to FIG. 1, a certain prior art disclosed an optical connector, which suggests an optical connector that may allow the boot structure to rotate, thereby changing the polarity. As shown in FIG. 1, this technology teaches an alignment key 9405.1, which is disposed on the boot structure 9409.1. The boot structure 9409.1 is fixed by fixing the alignment key 9405.1 on a side of the optical connector housing 9401. When the alignment key 9405.1 is stretched out of the housing, the boot structure 9409.1 may be used to rotate.

The above information disclosed in this section is only for enhancement of understanding of the background of the described technology and therefore it may contain information that does not form the prior art that is already known to a person of ordinary skill in the art.

SUMMARY OF THE INVENTION

The present invention provides an optical connector, which is used to fix the boot structure on the connector body through changing the position of the sliding member disposed on the optical connector body, or to remove the boot structure from the connector body to achieve the effect of changing the polarity of the optical connector.

The present invention provides an optical connector module. When the optical connector is inserted into the optical receptacle, the sliding member arranged on the optical connector body is used to prevent the optical connector from being accidentally pulled out due to an external force. When the sliding member slides to a first position, the optical connector may not be taken away from the optical receptacle, but when the sliding member slides to a second position, the optical connector may be taken away from the optical receptacle. The coupling relationship between the optical connector and the receptacle is stabilized by changing the position of the sliding member.

In one embodiment of the present invention, the present invention provides an optical connector for coupling to an optical receptacle, comprising: a connector body, inserted into the optical receptacle, the connector body having a housing and a detachable boot structure disposed in the housing; and a sliding member, slidably disposed on the connector body, the boot structure being restrained in or taken away from the housing by different positions of the sliding member.

In another embodiment of the present invention, the present invention also provides an optical connector module, comprising: an optical receptacle, having a coupling portion; an optical connector, inserted into the optical receptacle from one side of the optical receptacle to be coupled with the coupling portion, the optical connector comprising: a connector body, coupled to the coupling portion, the connector body having a housing and a detachable boot structure disposed in the housing; and a sliding member, slidably disposed on the connector body, the boot structure being restrained in or taken away from the housing by different positions of the sliding member.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

DETAILED DESCRIPTION OF THE PREFERRED EMBODIMENTS

Figure 1:
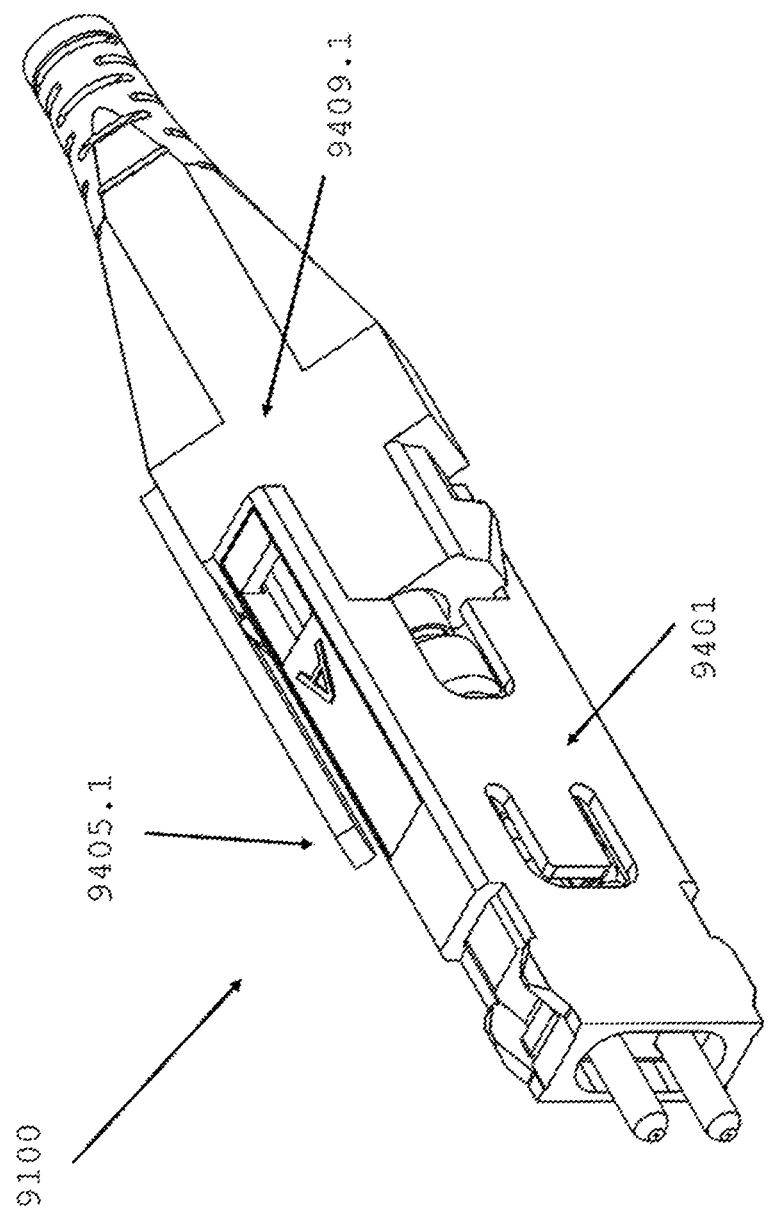
FIG. 1 is a schematic diagram of a conventional optical connector.

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate an optical connector and module thereof and to aid it of skilled in the art in practicing this invention. These embodiments are merely exemplary embodiments and in no way to be considered to limit the scope of the invention in any manner.

Figure 2:
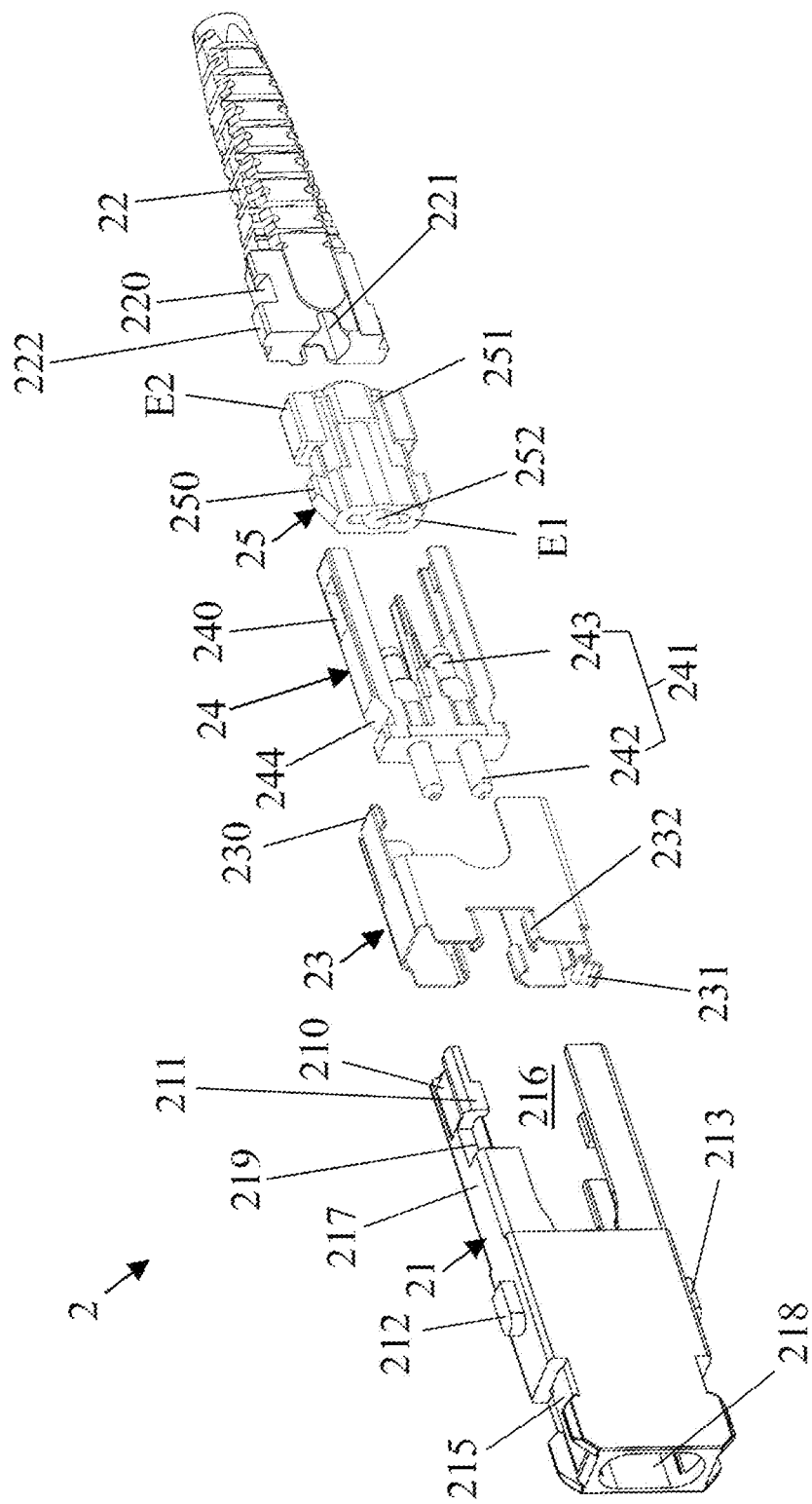
FIG. 2 is a three-dimensional exploded schematic diagram of the optical connector in the present invention.
Figure 3:
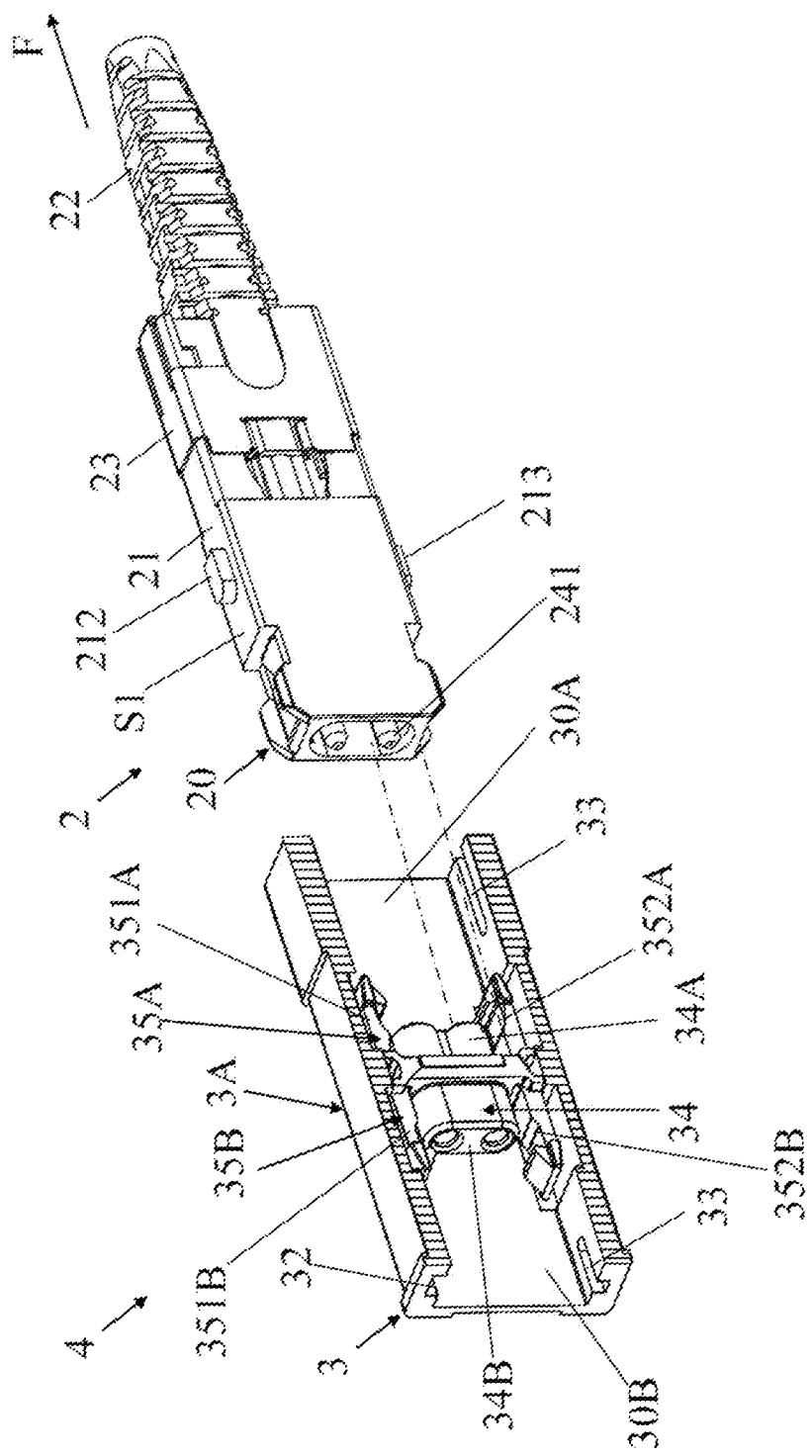
FIG. 3 is a schematic cross-sectional diagram of the optical connector and the optical receptacle in the present invention.
Figure 4:
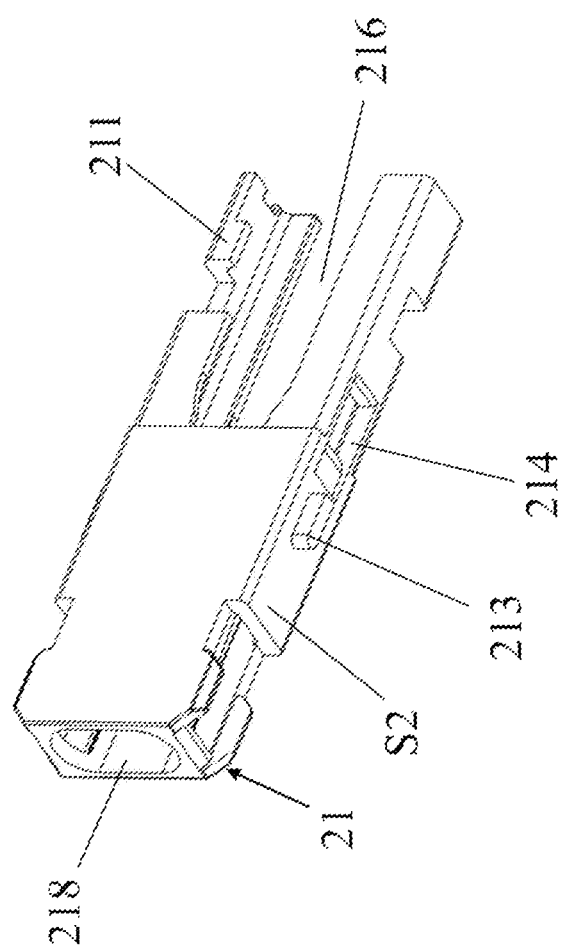
FIG. 4 is a schematic diagram of an embodiment of the housing from different perspectives.

Please refer to FIG. 2 to FIG. 4, in which FIG. 2 is a three-dimensional exploded schematic diagram of the optical connector in the present invention, FIG. 3 is a schematic cross-sectional diagram of the optical connector and the optical receptacle in the present invention, and FIG. 4 is a schematic diagram of an embodiment of the housing from different perspectives. In this embodiment, the optical connector 2 is an SN optical connector, but it is not limited thereto. The optical connector 2 is used for inserting into the optical receptacle 3, and includes a connector body 20 and a sliding member 23. The connector body 20 has a housing 21, a coupling head 24, a guiding structure 25 and a boot structure 22. One end of the housing 21 has an insertion hole 216, and another end of the housing 21 has a coupling hole 218 to communicate with the insertion hole 216. The housing 21 has a housing rod 217 with a second buckle structure 210, a recess portion 219, and a first positioning structure 211.

The first side surface S1 of the housing 21 has a first foolproof structure 212, and the second side surface S2 corresponding to the first side surface S1 has a second foolproof structure 213. The first foolproof structure 212 and second foolproof structure 213 have different sizes. The optical receptacle 3 has a third foolproof structure 32 at a position corresponding to the first foolproof structure 212, and has a fourth foolproof structure 33 at a position corresponding to the second foolproof structure 213. When the optical connector 2 is inserted into the optical receptacle 3, the third foolproof structure 32 allows the first foolproof structure 212 to pass through, and the fourth foolproof structure 33 allows the second foolproof structure 213 to pass through. On one side of the housing 21, the second side surface S2 in this embodiment has a second stopping structure 214, and an opening 215 is disposed on one end of the top side of the housing 21, and the purpose and function of which would be described later.

The coupling head 24 is installed into the housing 21 through the insertion hole 216. In this embodiment, a pair of coupling terminals 241 are disposed on the coupling head 24, one end 242 of coupling terminals 241 passes through the coupling hole 218, and another end 243 is coupled to a communication wire (not shown). In this embodiment, the communication wire is an optical fiber wire. There is a third positioning structure 240 on the coupling head 24. The coupling head 24 has a groove 244 at a position corresponding to the opening 215 of the housing 21. When the coupling head 24 is installed in the housing 21, the groove 244 is accommodated in the opening 215. In addition, there is a guiding structure 25 on another side of the coupling head 24 to guide a communication wire. The first end E1 of the guiding structure 25 has a fourth positioning structure 250, which is coupled to the third positioning structure 240 when the guiding structure 25 is combined with the coupling head 24. In this embodiment, the third positioning structure 240 is a groove structure, and the fourth positioning structure 250 is a convex structure for snapping into the groove structure. It should be noted that, in another embodiment, the third positioning structure 240 may also be a convex structure, the fourth positioning structure 250 may also be a groove structure, and they are also combined with each other. The second end E2 of the guiding structure 25 is coupled to the boot structure 22. The guiding structure 25 further has a second braking structure 251. In this embodiment, the second braking structure 251 is a stopping surface structure. The guiding structure 25 has a first through hole 252, and the communication wire passes through the first through hole 252 to be coupled to the end 243 of the coupling terminal 241. It should be noted that although in this embodiment, the coupling head 24 and the guiding structure 25 may be designed separately, in another embodiment, the coupling head 24 and the guiding structure 25 may be integral formed.

The boot structure 22 is disposed on one side of the guiding structure 25, and the boot structure 22 has a second through hole 221, which penetrates the entire boot structure 22. The second through hole 221 corresponds to the first through hole 252 and is used for allowing communication wires to pass through. The boot structure 22 has a second positioning structure 220, which is combined with the first positioning structure 211 when the boot structure 22 is installed in the housing 21. In this embodiment, the first positioning structure 211 is a convex structure, the second positioning structure 220 is a groove structure, and they may be combined with each other. In another embodiment, the first positioning structure 211 may also be a groove structure, the second positioning structure 220 may also be a convex structure, and they may also be combined with each other. In addition, when the boot structure 22 is installed in the housing 21, the protruding body 222 at the front end of the boot structure 22 is also accommodated in the recess portion 219, so that the boot structure 22 may achieve a double positioning effect by the first positioning structure 211 combining with the second positioning structure 220 and the protruding body 222 combining with the recess portion 219.

The sliding member 23 is slidably disposed on the connector body 20. The sliding member 23 can restrain the boot structure 22 in the housing 21 or release the boot structure 22 by changing the sliding position, so that the boot structure 22 can be taken away from the housing 21. The sliding member 23 further has a first stopping structure 231. During the movement of the sliding member 23, the first stopping structure 231 may be restrained to move within the second stopping structure 214 on one side of the housing 21. In this embodiment, the first stopping structure 231 is a bent plate, which is connected to the sliding member 23, and the second stopping structure 214 on the housing 21 is a sliding groove structure. When the first stopping structure 231 is located in the second stopping structure 214, the sliding member 23 restrains the boot structure 22 to prevent the boot structure 22 from leaving the housing 21. When the first stopping structure 231 is forced to separate from the second stopping structure 214, the boot structure 22 is no longer restrained by the sliding member 23, so that it may be taken away from the housing 21. The detailed description would be described later.

Figure 6:
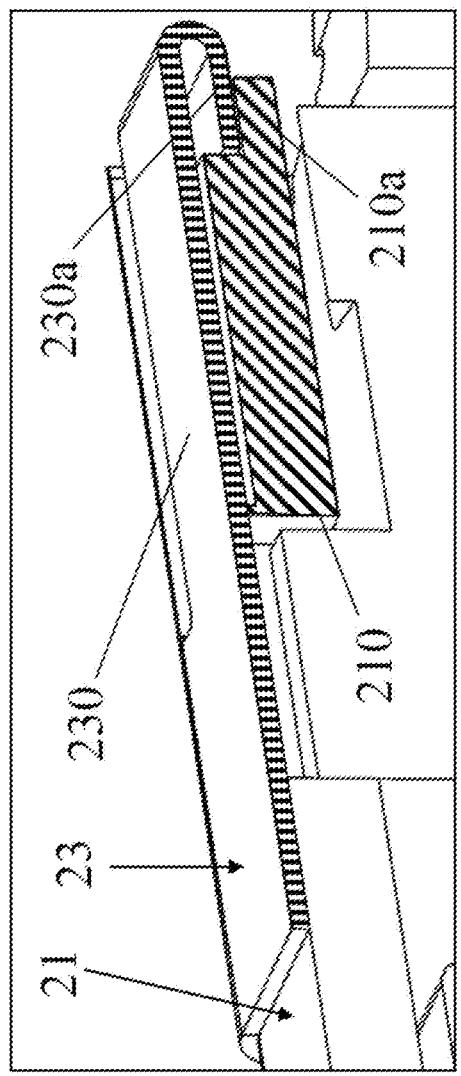
FIG. 6 is a partial cross-sectional schematic diagram of combining the housing with the sliding member in the present invention.
Figure 7:
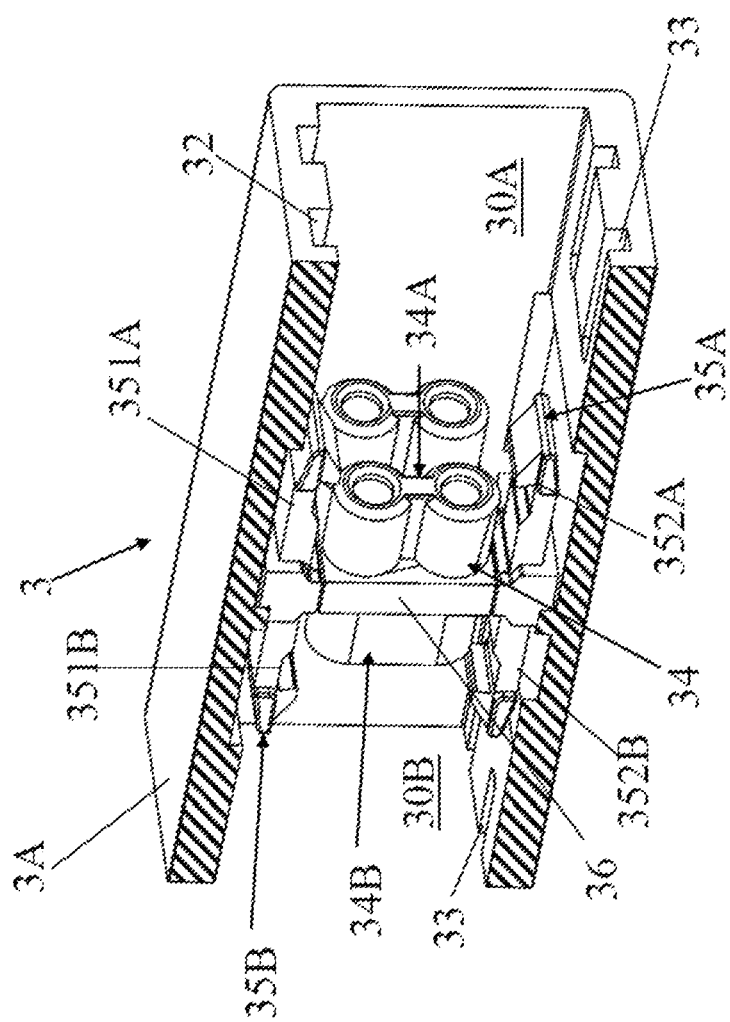
FIG. 7 is a schematic cross-sectional diagram of the optical receptacle in the present invention.

The sliding member 23 further has a first buckle structure 230 and a first braking structure 232, wherein the first buckle structure 230 is used to buckle with the second buckle structure 210 on the housing 21. In this embodiment, as shown in FIG. 6, which is a partial cross-sectional schematic diagram of combining the housing with the sliding member in the present invention. The first buckle structure 230 is an extending plate, and a hook 230a is disposed at the end of the first buckle structure 230, and the second buckle structure 210 is a trough structure, which has a notch 210a on its end surface and the hook 230a is leaned against the notch 210a. It should be noted that the way in which the first buckle structure 230 and the second buckle structure 210 are buckled is not limited to the way shown in the FIG. 6, as long as the buckle relationship between the first buckle structure 230 and the second buckle structure 210 is a releasable design, that may meet the spirit of the present invention. Therefore, the person having ordinary skill in the art may refer to the conventional technology to implement that in other ways described as follows. In the first state, the first buckle structure is a convex structure, the second buckle structure is a groove structure, and the first buckle structure is embedded in the second buckle structure. In the second state, the user may pull the first buckle structure to leave the second buckle structure. This mechanism is well known to the person having ordinary skill in the art, and is not repeated herein.

Figure 5:
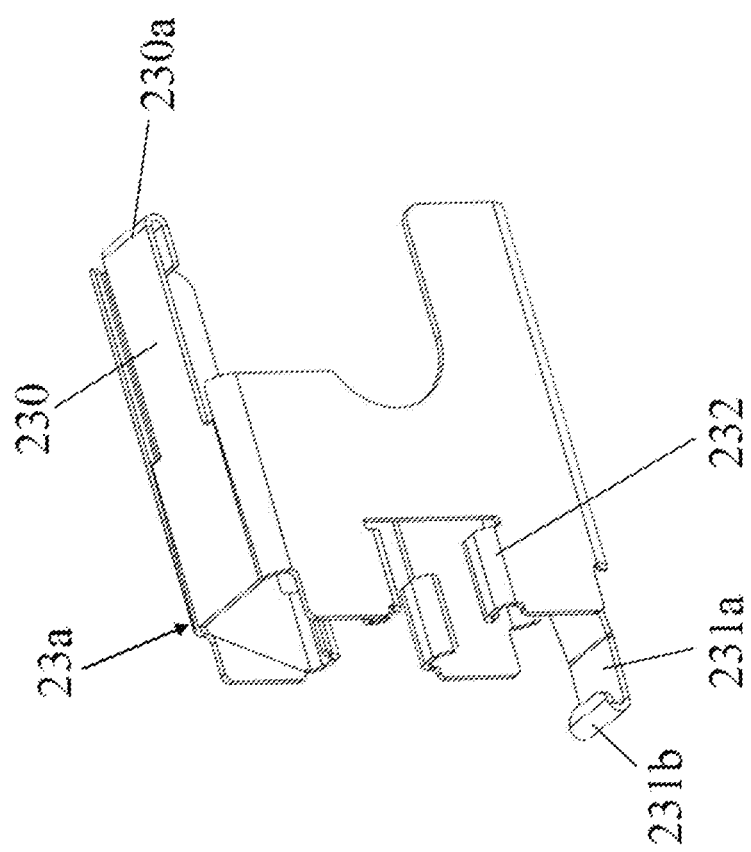
FIG. 5 is a three-dimensional schematic diagram of another embodiment of the sliding member in the present invention.

Please refer to FIG. 5, which is a three-dimensional schematic diagram of another embodiment of the sliding member in the present invention. In this embodiment, the design of the sliding member 23a is similar to the previous embodiment. The main difference is that the first stopping structure 231a in this embodiment is not a bent plate, but a structure of an extended pressing plate. There is an undercut structure 231b at the end of the first stopping structure 231a, which may achieve the same effect as the aforementioned first stopping structure 231.

Next, it would be explained that the optical connector 2 of the present invention can achieve the effect of not separating from the optical receptacle 3 when pulled by an external force deliberately or accidentally. Please refer to FIGS. 2 to 4 and FIG. 7, the optical connector 2 in this embodiment is combined with the optical receptacle 3. The optical receptacle 3 includes a receptacle housing 3A, the first side and the second side of which have insertion ports 30A and 30B, respectively, and the insertion ports 30A and 30B may be inserted by the optical connector 2. The receptacle housing 3A has a coupling portion 34, which further has a first coupling structure 34A and a second coupling structure 34B, which are respectively formed on two sides of the supporting plate 36. In this embodiment, the first coupling structure 34A and the second coupling structure 34B respectively have a pair of hollow cylindrical structures for allowing the pair of coupling terminals 241 of the optical connector 2 to pass through. Because the hollow cylindrical structures of the first coupling structure 34A and second coupling structure 34B correspond to and communicate with each other, the optical connectors inserted through the insertion ports 30A and 30B on the first side and second side can be coupled to each other for transmission signal.

Figure 8:
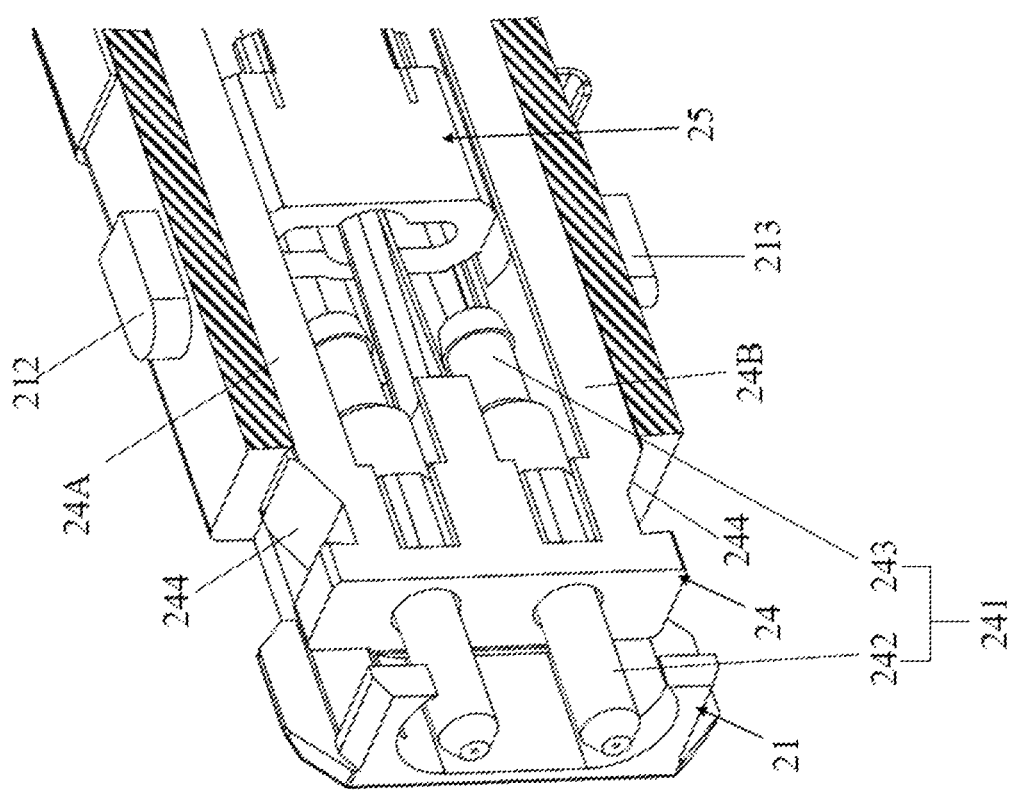
FIG. 8 is a schematic cross-sectional diagram of an embodiment of the optical connector in the present invention.

In this embodiment, a first clamping structure 35A and a second clamping structure 35B are respectively formed on both sides of the upper end and the lower end of the supporting plate 36, wherein the first clamping structure 35A has a pair of first clamping elements 351A and 352A, which are respectively formed on the upper and lower sides of the first coupling structure 34A, and the second clamping structure 35B has a pair of second clamping elements 351B and 352B, which are respectively formed on the upper and lower sides of the second coupling structure 34B. The first clamping elements 351A and 352A of the first clamping structure 35A are used to clamp the optical connector 2 inserted through the insertion port 30A. Similarly, the second clamping elements 351B and 352B of the second clamping structure 35B are used to clamp the optical connector 2 inserted through the insertion port 30B. Please refer to FIG. 8, which is a schematic cross-sectional diagram of an embodiment of the optical connector in the present invention. In this embodiment, the coupling head 24 of the optical connector 2 has a pair of parallel supporting rods 24A and 24B, which are encapsulated in the housing 21. Each support rod 24A and 24B has a groove 244 at its end. As shown in FIG. 3 and FIG. 8, when the optical connector 2 is inserted into the optical receptacle 3 through the insertion port 30A, the hooks of the first clamping elements 351A and 352A of the first clamping structure 35A in the optical receptacle 3 correspond to the supporting rods 24A and 24B. Therefore, when the optical connector 2 is inserted into the optical receptacle 3, the hooks of the first clamping elements 351A and 352A may slide into the corresponding grooves 244, and fix the optical connector 2.

Figure 9A:
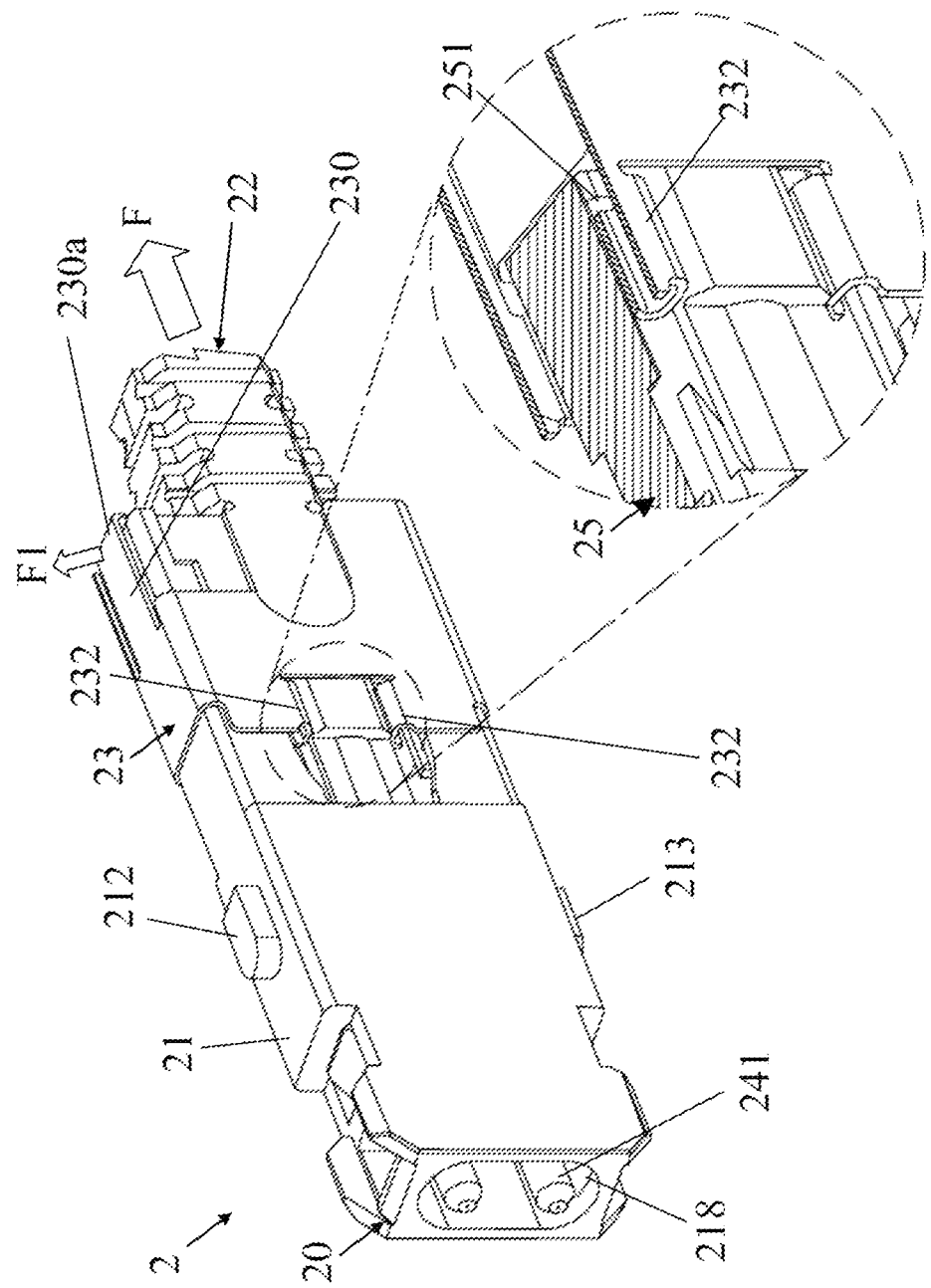
FIG. 9A is a three-dimensional and partial cross-sectional schematic diagram of the sliding member at the first position of the optical connector.
Figure 9B:
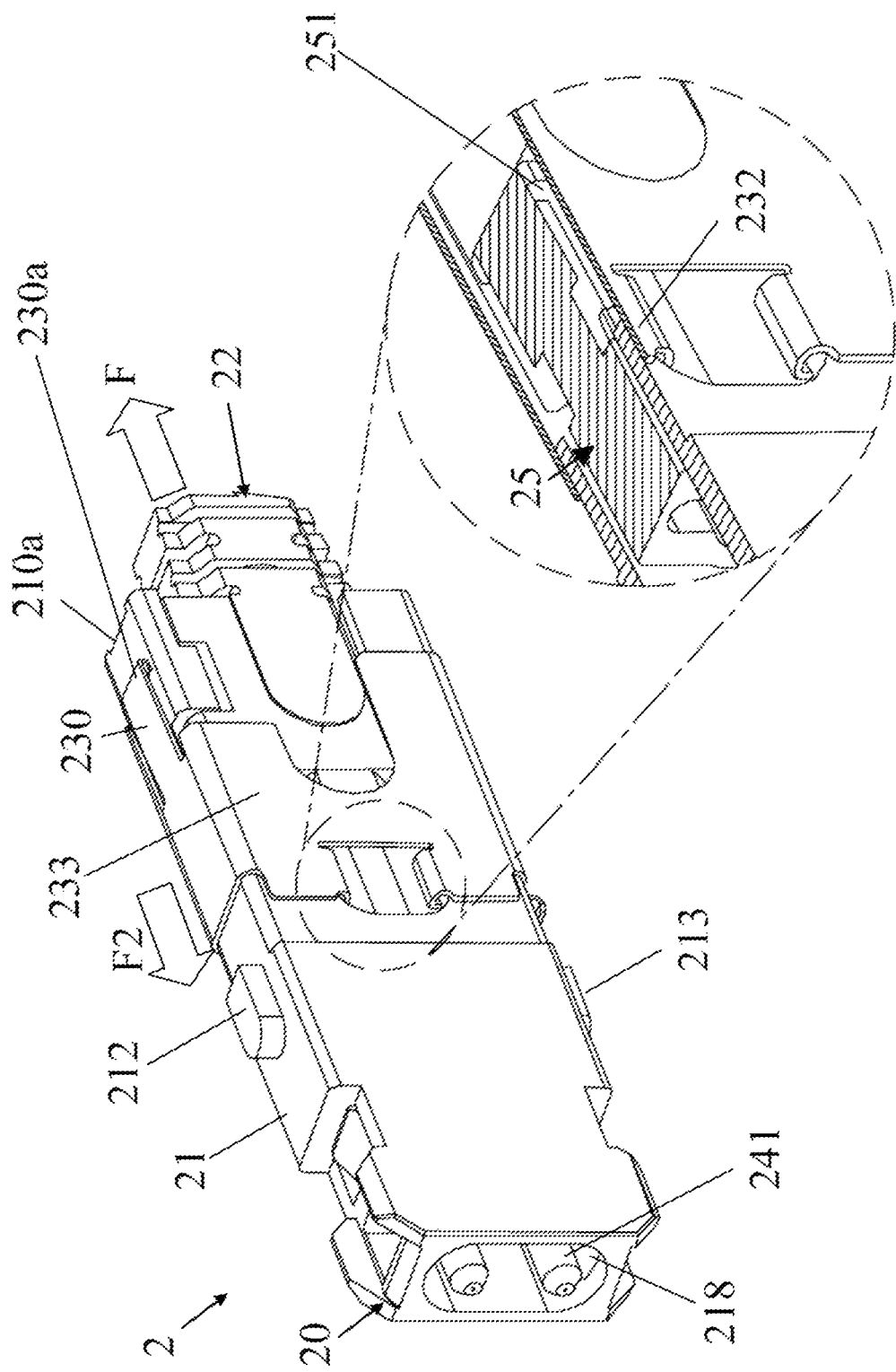
FIG. 9B is a three-dimensional and partial cross-sectional schematic diagram of the sliding member at the second position of the optical connector.
Figure 9C:
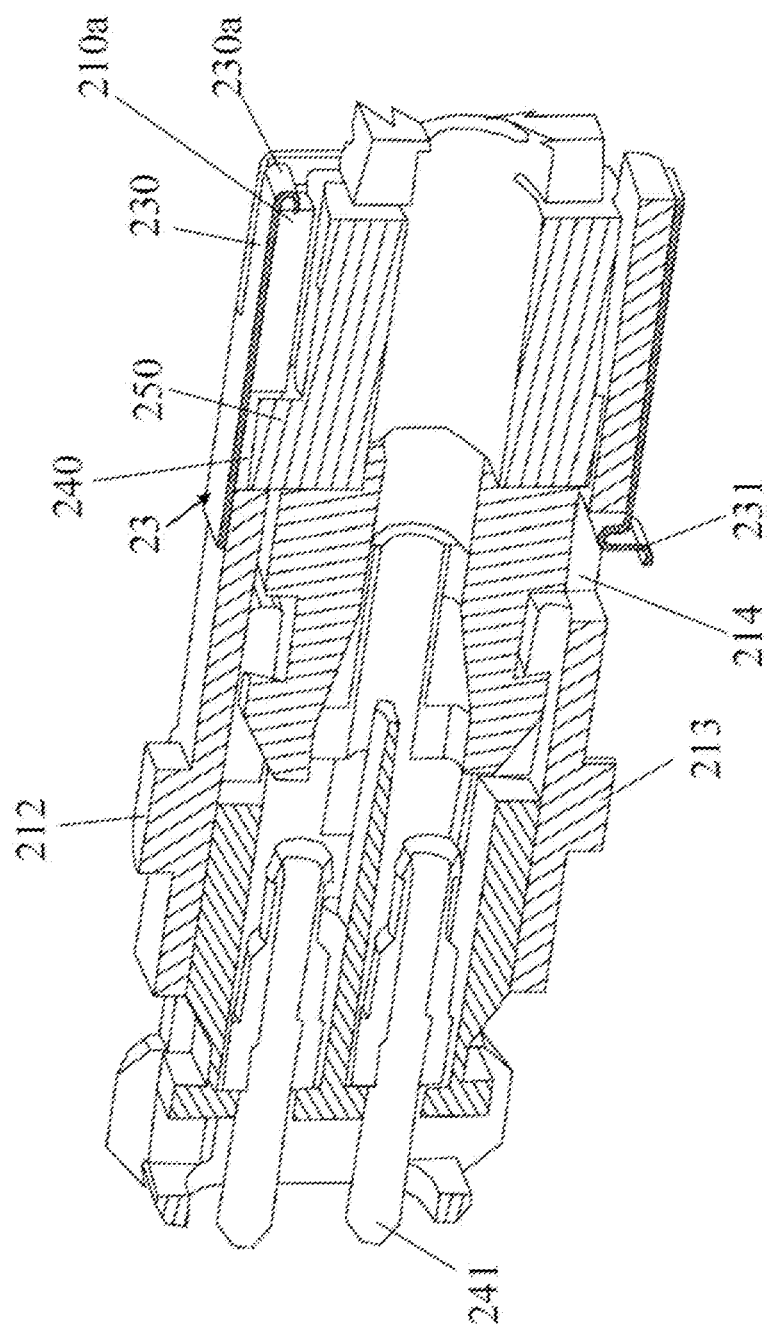
FIGS. 9C and 9D are schematic cross-sectional diagrams of the sliding member of the optical connector at the first position and the second position, respectively.
Figure 9D:
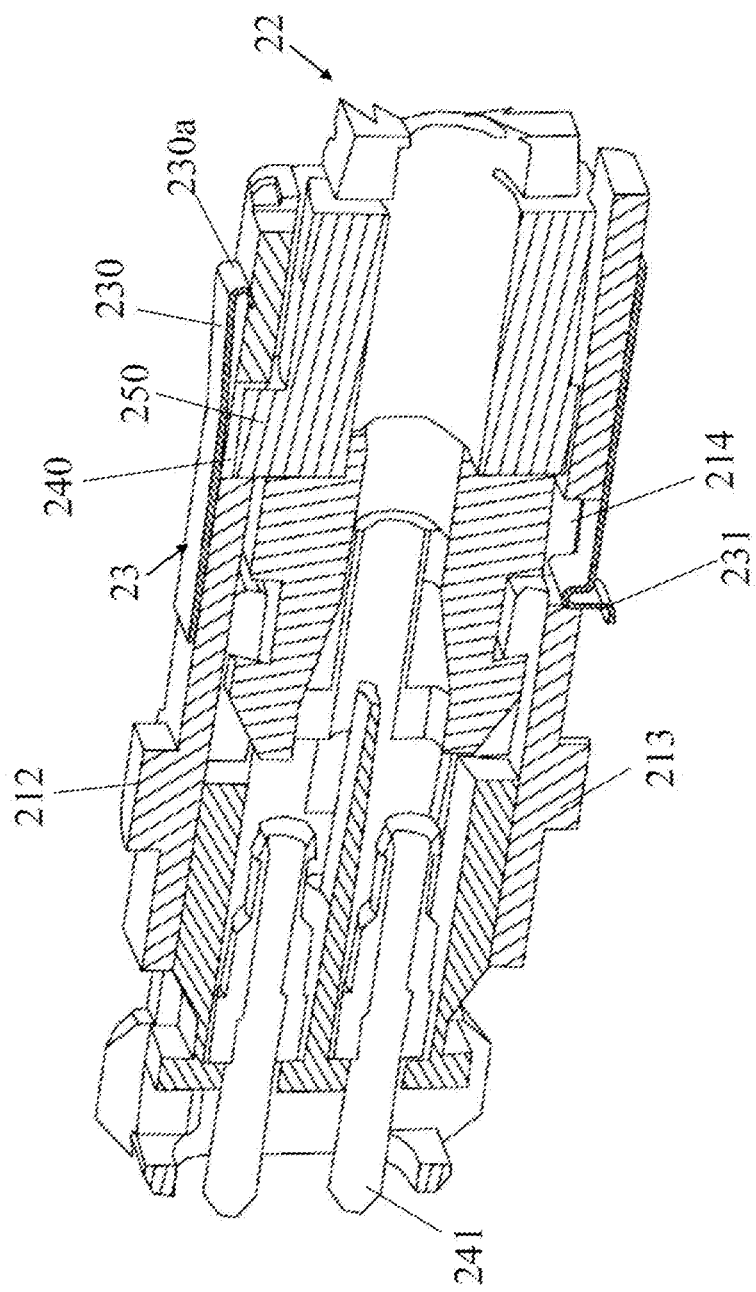
Figure 9E:
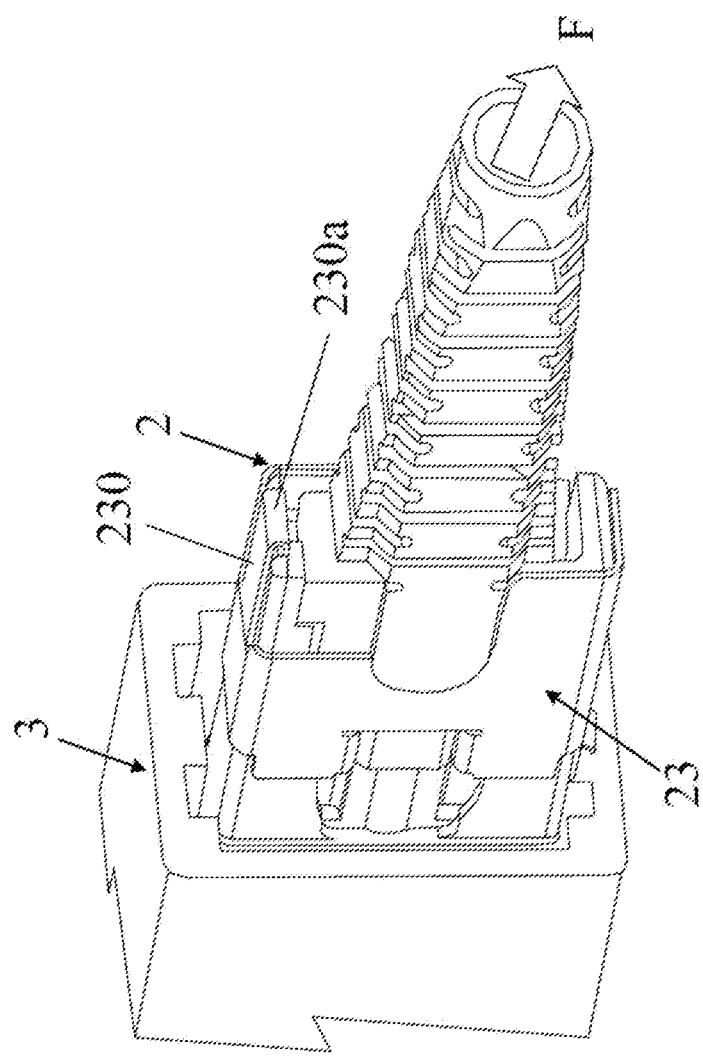
FIGS. 9E and 9F are schematic diagrams showing the combination of the optical connector and the optical receptacle when the sliding member is at the first position and the second position, respectively.
Figure 9F:
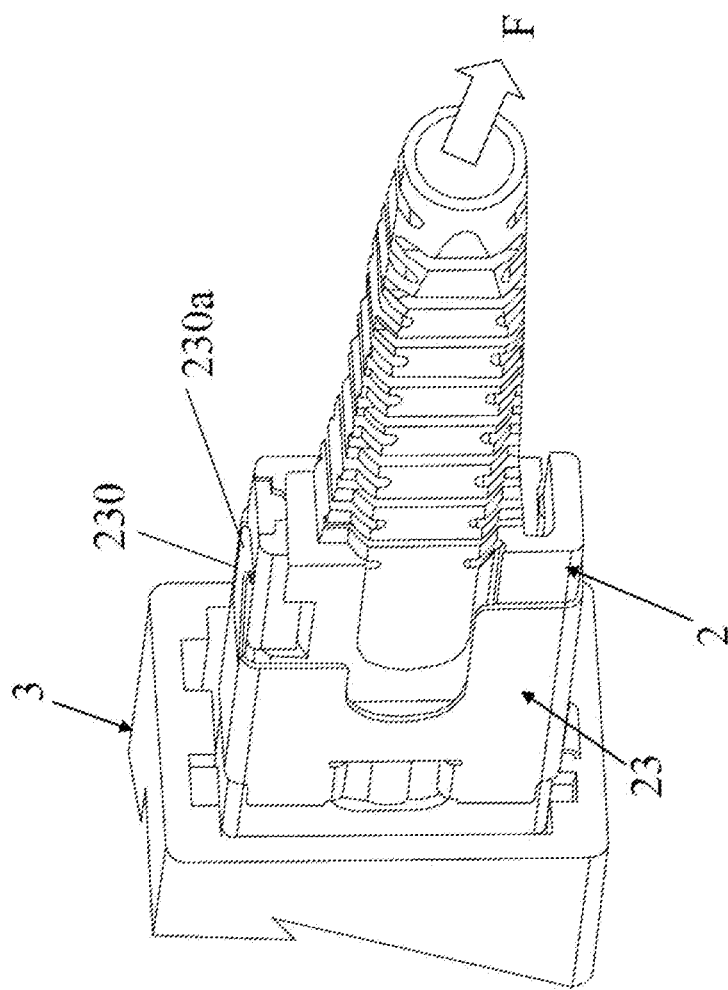

Please refer to FIGS. 3 and 4 and FIGS. 9A to 9F, where FIGS. 9A and 9B are three-dimensional and partial cross-sectional schematic diagrams of the sliding member, FIGS. 9C and 9D are schematic cross-sectional diagrams of the sliding member of the optical connector at the first position and the second position respectively, and FIGS. 9E and 9F are schematic diagrams showing the combination of the optical connector and the optical receptacle. In one embodiment, as shown in FIGS. 9A, 9C, and 9E, the sliding member 23 is located at the first position. In the first position, the first braking structure 232 leans against the second braking structure 251 on the connector body 20. In addition, the hook 230a of the first buckle structure 230 and the notch 210a are leaned against each other. At the same time, the first stopping structure 231 is located on one side of the second stopping structure 214. Since the end surface of the first braking structure 232 leans against the second braking structure 251 on the guiding structure 25, and the hook 230a of the first buckle structure 230 and the notch 210a are leaned against each other, the optical connector 2 may be restrained when the boot structure is pulled by a force F. Therefore, the optical connector 2 may be prevented from leaving the optical connector receptacle 3 in the direction of the pulling force F. Therefore, when the sliding member 23 is in the first position, regardless of the user pulls the optical connector 2 deliberately or accidentally, the optical connector 2 may not be taken away from the optical receptacle 3.

If the user wants to pull the optical connector 2 out of the optical receptacle 3, the user can move the sliding member 23 to the second position. This operation mode can provide an external force F1 to move the hook 230a of the first buckle structure 230 of the sliding member 23, as shown in FIGS. 9B, 9D, and 9F, to make the hook 230a of the first buckle structure 230 take away from the notch 210a, and the sliding member 23 is pushed by an external force F2 to move to the second position. When the sliding member 23 moves to the second position, the first stopping structure 231 slides to another side of the second stopping structure 214, and the end surface of the first braking structure 232 is no longer leaned against the second braking structure 251 on the guiding structure 25. Therefore, when the boot structure 22 is pulled by the pulling force F, the optical connector 2 no longer receives any resistance, so that it may move in the direction of the pulling force F and leave the optical receptacle 3.

Next, how to change the polarity of the optical connector 2 in the present invention is going to be explained. The design of the sliding member 23 in the present invention may not only control the insertion/removal of the optical connector 2, but also control the polarity change of the optical connector 2. In another embodiment, following the state of the sliding member in FIGS. 9B, 9D and 9F, since the first stopping structure 231 slides to another side of the second stopping structure 214, the lateral baffle 233 of the sliding member 23 may block the boot structure 22, as shown in FIG. 9B. Therefore, the boot structure 22 may not be disassembled for polarity change in this state. When the user needs to change the polarity, the sliding member 23 may be further slid to the third position. The way of movement is that the user pulls the first stopping structure 231 to make the first stopping structure 231 separated from the second stopping structure 214, so that the first stopping structure 231 is no longer restrained in the second stopping structure 214. Once the first stopping structure 231 is separated from the second stopping structure 214, the sliding member 23 is able to continue to move and change from the state of FIG. 9B to the state of FIG. 10A. In this embodiment, the third position is a position where the side 23A of the sliding member 23 leans against the side 21A of the housing 21 (as shown in FIG. 10B).

Figure 10A:
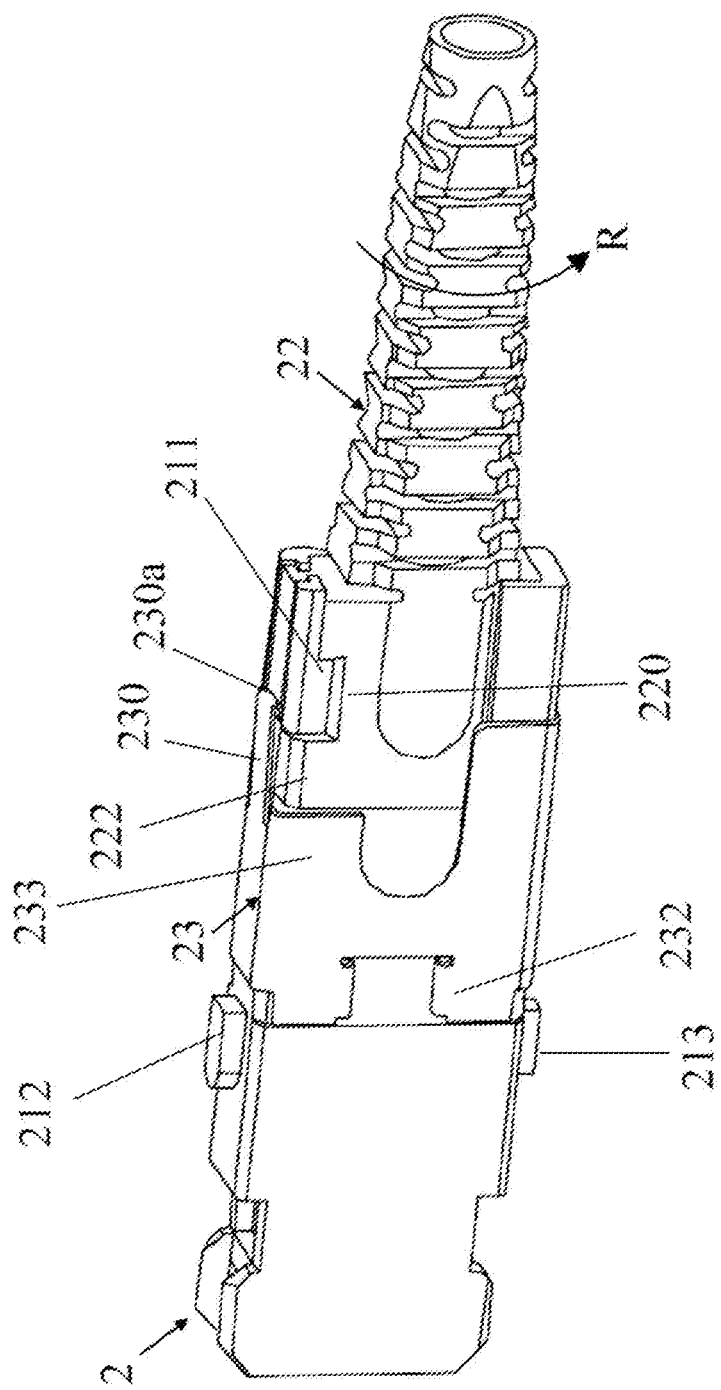
FIG. 10A is a three-dimensional schematic diagram of the optical connector when the sliding member is at the third position.
Figure 10B:
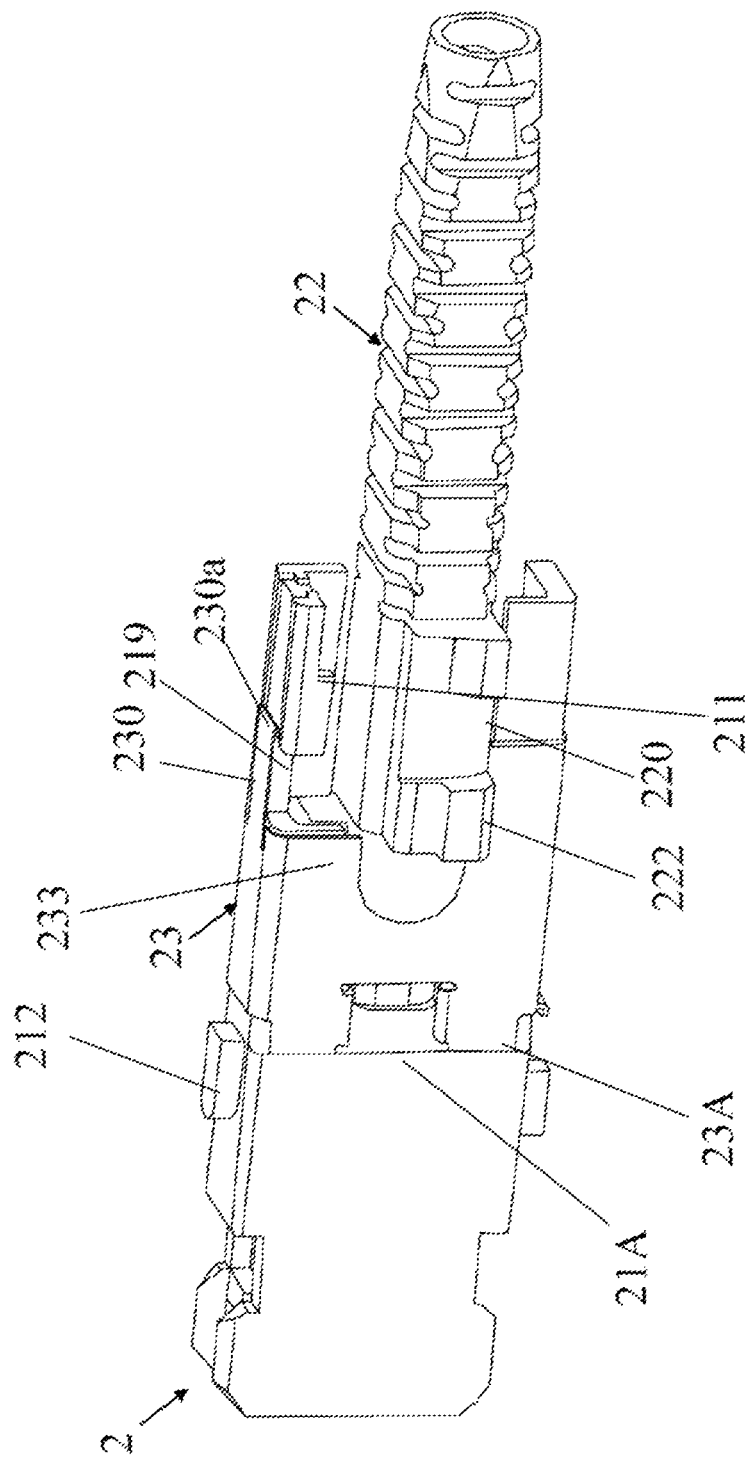
FIG. 10B is a three-dimensional schematic diagram of rotating the boot structure of the optical connector when the sliding member is at the third position.
Figure 10C:
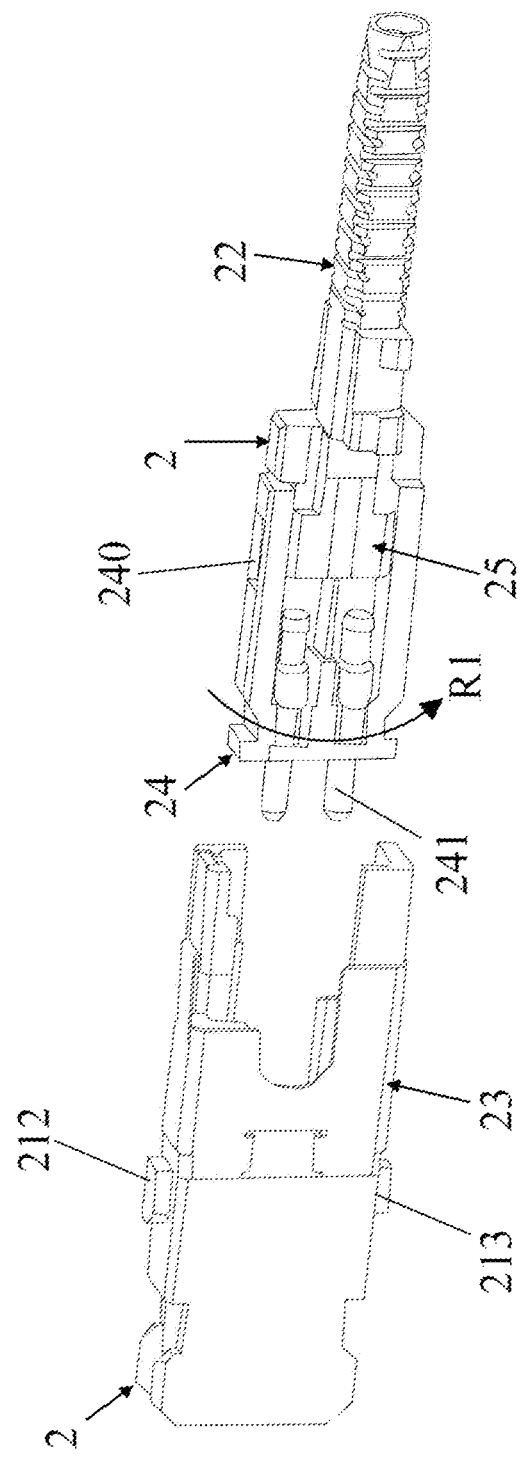
FIG. 10C is a schematic diagram of changing the polarity of the optical connector when the sliding member is at the third position.

In the state of FIG. 10A, the protruding body 222 at the front end of the boot structure 22 is no longer restrained by the lateral baffle 233 of the sliding member 23. Therefore, the user may rotate the boot structure 22 in this state to perform a rotating movement R to make the boot structure rotate 90 degrees to form the state shown in FIG. 10B. In the state of FIG. 10B, the boot structure 22 may be taken away to form the state of FIG. 10C. Once the boot structure 22, the coupling head 24, and the guiding structure 25 are pulled out of the housing 21, the coupling head 24 may be rotated through a rotational movement R1 and turned 180 degrees, so that the coupling terminal 241 can be reversed up and down. Next, the coupling head 24, the guiding structure 25 and the boot structure 22 are installed back into the housing 21, and the sliding member 23 is slid to the first position to fix the boot structure 22 in the housing 21 to complete the polarity change.

Figure 11:
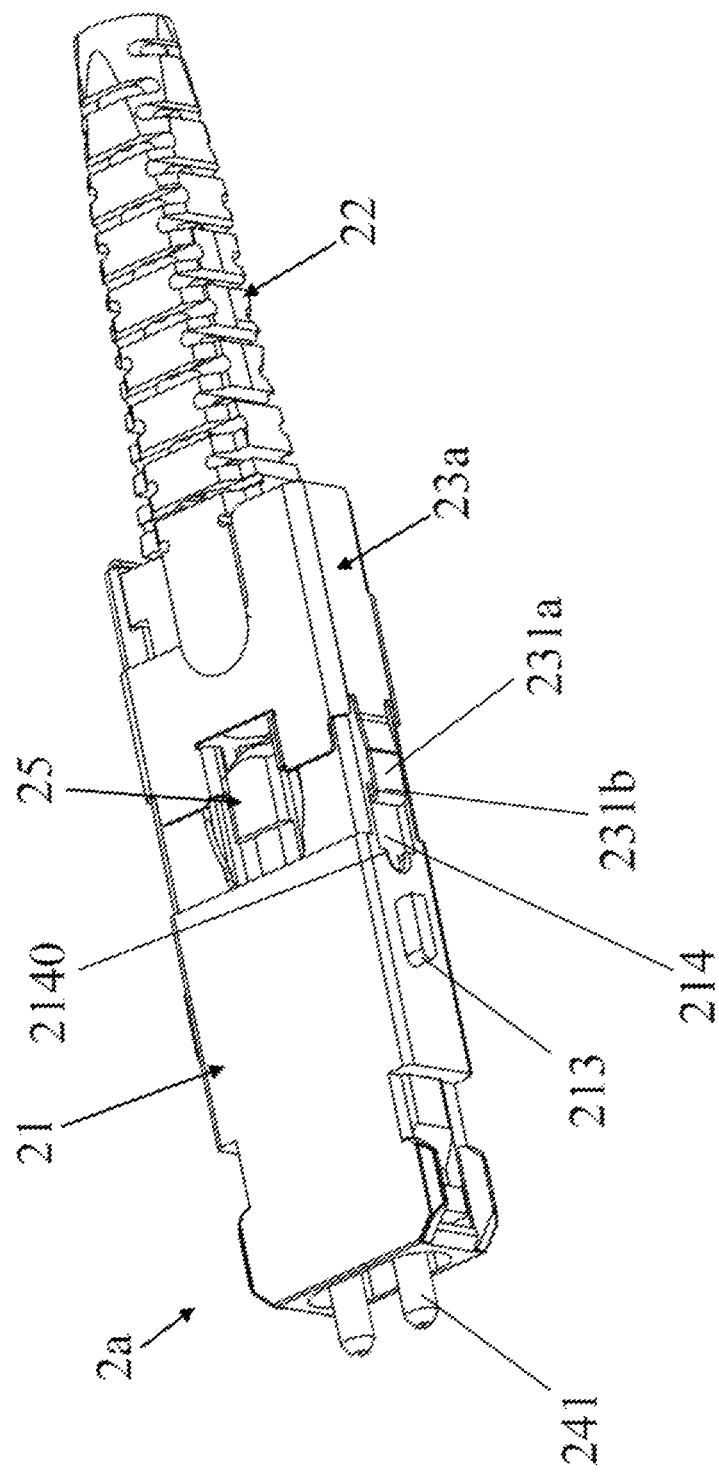
FIG. 11 is a three-dimensional schematic diagram of another embodiment of the optical connector in the present invention.

Please refer to FIG. 11, which is a three-dimensional schematic diagram of another embodiment of the optical connector in the present invention. The optical connector 2a of this embodiment is similar to the foregoing embodiment, the main difference is that in this embodiment, the structure of the sliding member 23a has some differences. The first stopping structure 231a of the sliding member 23a is an extended pressing plate structure, and its extended end has an undercut structure 231b. The first stopping structure 231a also has three positions. In this embodiment, the first position, that is, the first stopping structure 231a is accommodated in the second stopping structure 214. In this state, the optical connector 2a may not be taken away from the optical receptacle. When the sliding member 23 moves to the second position, that is, the undercut structure 231b leans against the lateral end surface 2140 of the second stopping structure 214. At this time, the optical connector is unlocked, so that the optical connector may be taken away from the optical receptacle. As for the theory of unlocking as mentioned above, it would not be repeated herein. As for changing the polarity, the undercut structure 231b of the sliding member 23 is pulled away from the groove of the second stopping structure 214 to make the sliding member 23 slide until the boot structure 22 is rotated. The other parts are as mentioned before, it would not be repeated herein. It should be noted that the undercut structure 231b in this embodiment can be a bent plate like the first stopping structure shown in FIG. 2, but it is not the only design, as long as the design of the first stopping structure and the second stopping structure for positioning the sliding member in the first position, the second position and the third position may be achieved, it can be implemented. Such mechanisms are well known to those skilled in the art, and it would not be repeated herein.

In summary, by changing the sliding position of the sliding member, it is possible to achieve multiple effects of fixing the optical connector in the optical receptacle, releasing the locking relationship between the optical connector and the optical receptacle, and changing the polarity through a single element.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. An optical connector for coupling to an optical receptacle, comprising:
    a connector body, for inserting into the optical receptacle, the connector body having a housing and a detachable boot structure disposed in the housing; and
    a sliding member, slidably disposed on the connector body, the boot structure being restrained in or taken away from the housing and the sliding member by different positions of the sliding member.

2. The optical connector of claim 1, wherein the housing has a first positioning structure, and the boot structure has a second positioning structure, when the boot structure is installed in the housing, the second positioning structure is combined with the first positioning structure.

3. The optical connector of claim 1, wherein the sliding member has a first stopping structure, and a second stopping structure is disposed on one side of the housing to restrain a movement of the first stopping structure in a range, when the sliding member is located at a first position, the first stopping structure is leaned against a first side of the second stopping structure to restrain the connector body to prevent the connector body from being taken away from the optical receptacle.

4. The optical connector of claim 3, wherein when the sliding member is in a second position, the first stopping structure is separated from the first side of the second stopping structure to release the connector body, and the connector body is taken away from the optical receptacle by a force.

5. The optical connector of claim 3, wherein when the first stopping structure is separated from the second stopping structure, the sliding member slides to a third position, the boot structure is not restrained by the sliding member, and the boot structure is taken away from the housing by rotating an angle.

6. The optical connector of claim 3, wherein the first stopping structure is a bent plate connected to the sliding member, and the second stopping structure is a sliding groove structure; when the bent plate is located in the sliding groove structure, the sliding member restrains the boot structure; when the bending plate is separated from the sliding groove structure by a force, the boot structure is taken away from the housing.

7. The optical connector of claim 3, wherein the first stopping structure is an extended pressing plate connected to the sliding member, and the second stopping structure is a sliding groove structure; when the extended pressing plate is located in the sliding groove structure, the sliding member restrains the boot structure; when the extended pressing plate is separated from the sliding groove structure by a force, the boot structure is taken away from the housing.

8. The optical connector of claim 1, wherein the sliding member comprises:
    a first buckle structure, buckled with a second buckle structure on the housing; and
    a first braking structure, leaned against a second braking structure on the connector body when the boot structure is pulled by a force, and the housing is restrained from moving in a direction of the force.

9. The optical connector of claim 8, wherein the housing comprises:
    a coupling head, coupled to a communication wire, the coupling head having a third positioning structure; and
    a guiding structure, guided the communication wire, a first end of the guiding structure having a fourth positioning structure combined with the third positioning structure, a second end of the guiding structure coupled to the boot structure, and the guiding structure having the second braking structure corresponding to the first braking structure.

10. The optical connector of claim 8, wherein the guiding structure and the coupling head are integrally formed.

11. An optical connector module, comprising:
    an optical receptacle, having a coupling portion;
    an optical connector, inserted into the optical receptacle from one side of the optical receptacle to be coupled with the coupling portion, the optical connector comprising:
        a connector body, coupled to the coupling portion, the connector body having a housing and a detachable boot structure disposed in the housing; and
        a sliding member, slidably disposed on the connector body, the boot structure being restrained in or taken away from the housing and the sliding member by different positions of the sliding member.

12. The optical connector module of claim 11, wherein the housing has a first positioning structure, and the boot structure has a second positioning structure, when the boot structure is installed in the housing, the second positioning structure is combined with the first positioning structure.

13. The optical connector module of claim 11, wherein the sliding member has a first stopping structure, and a second stopping structure is disposed on one side of the housing to restrain a movement of the first stopping structure in a range, when the sliding member is located at a first position, the first stopping structure is leaned against a first side of the second stopping structure to restrain the connector body to prevent the connector body from being taken away from the optical receptacle.

14. The optical connector module of claim 13, wherein when the sliding member is in a second position, the first stopping structure is separated from the first side of the second stopping structure to release the connector body, and the connector body is taken away from the optical receptacle by a force.

15. The optical connector module of claim 13, wherein when the first stopping structure is separated from the second stopping structure, the sliding member slides to a third position, the boot structure is not restrained by the sliding member, and the boot structure is taken away from the housing by rotating an angle.

16. The optical connector module of claim 13, wherein the first stopping structure is a bent plate connected to the sliding member, and the second stopping structure is a sliding groove structure; when the bent plate is located in the sliding groove structure, the sliding member restrains the boot structure; when the bending plate is separated from the sliding groove structure by a force, the boot structure is taken away from the housing.

17. The optical connector module of claim 13, wherein the first stopping structure is an extended pressing plate connected to the sliding member, and the second stopping structure is a sliding groove structure; when the extended pressing plate is located in the sliding groove structure, the sliding member restrains the boot structure; when the extended pressing plate is separated from the sliding groove structure by a force, the boot structure is taken away from the housing.

18. The optical connector module of claim 11, wherein the sliding member comprises:
- a first buckle structure, buckled with a second buckle structure on the housing; and
- a first braking structure, leaned against a second braking structure on the connector body when the boot structure is pulled by a force, and the housing is restrained from moving in a direction of the force.

19. The optical connector module of claim 18, wherein the housing comprises:
- a coupling head, coupled to a communication wire, the coupling head having a third positioning structure; and
- a guiding structure, guided the communication wire, a first end of the guiding structure having a fourth positioning structure combined with the third positioning structure, a second end of the guiding structure coupled to the boot structure, and the guiding structure having the second braking structure corresponding to the first braking structure.

20. The optical connector module of claim 11, wherein a first side surface of the housing has a first foolproof structure, and a second side surface corresponding to the first side has a second foolproof structure, and the first foolproof structure and the second foolproof structure have different sizes; the optical receptacle has a third foolproof structure combined with the first foolproof structure at a position corresponding to the first foolproof structure, and has a fourth foolproof structure combined with the second foolproof structure at another position corresponding to the second foolproof structure.

* * * * *